No. 789,683. PATENTED MAY 9, 1905.
C. M. CAMPBELL.
CLEAN-OUT PLUG.
APPLICATION FILED JULY 15, 1904.
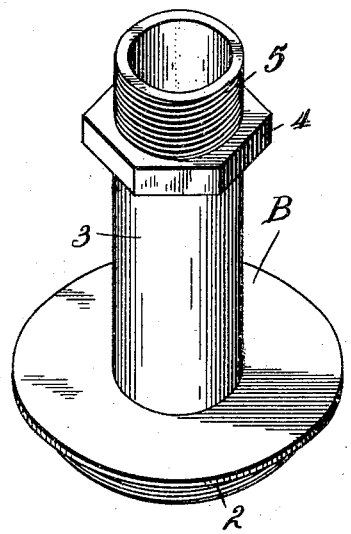
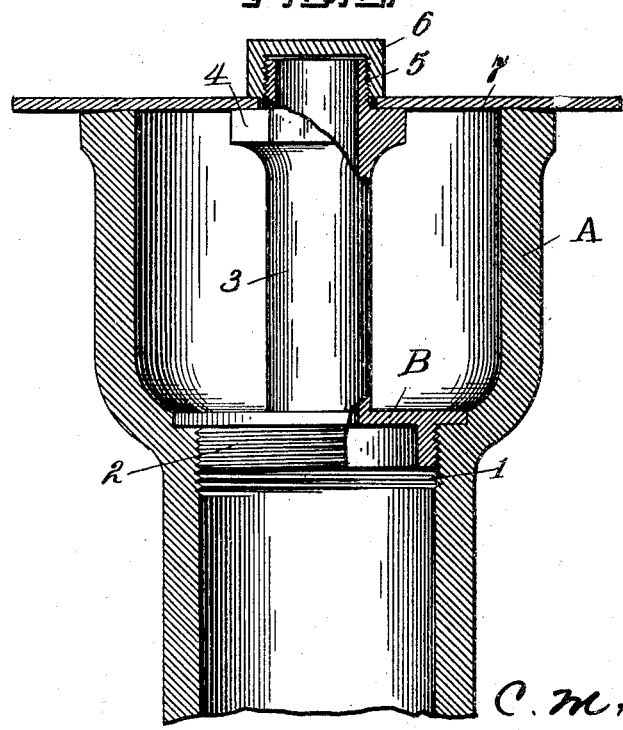

No. 789,683. Patented May 9, 1905.

UNITED STATES PATENT OFFICE.

CLARENC M. CAMPBELL, OF BIRMINGHAM, ALABAMA.

CLEAN-OUT PLUG.

SPECIFICATION forming part of Letters Patent No. 789,683, dated May 9, 1905.

Application filed July 15, 1904. Serial No. 216,683.

*To all whom it may concern:*

Be it known that I, CLARENC MONRO CAMPBELL, a citizen of the United States, and a resident of Birmingham, in the county of Jefferson and State of Alabama, have invented a new and useful Improvement in Clean-Out Plugs, of which the following is a specification.

My invention relates to an improvement in clean-out plugs adapted to be applied to any and all styles of cast-iron soil-pipe and fittings, as well as wrought-iron drainage-pipes and fittings, the object being to provide a plug which is equally applicable in its use as a clean-out appliance or a soil-pipe-testing plug; and it consists, mainly, in a plug adapted to be removably screwed into the pipe with which it is to be used, so that it can be taken out at any time it is necessary to clean out the pipe or extend the line of pipe, and provided with a nipple and screw-capped, whereby the pipe may be cleaned by removing the cap. Access can be gained by inserting a rod or wire through the nipple into the pipe without removing the entire plug, or the nipple can be used as a means of connecting the water-service to the pipe direct for testing purposes.

The invention further consists in certain elements for accomplishing the foregoing objects, which will be hereinafter fully described, and specified in the claims.

In the accompanying drawings, Figure 1 is a view in perspective of my improved plug, and Fig. 2 is a sectional view through the plug and the end of the pipe into which it is screwed.

A represents the hub or bell of a pipe, such as is for drains, soil-pipes, or similar purposes. A screw-thread 1 is tapped into the pipe where the hub or bell joins it.

B is the plug, provided with screw-threads 2, adapted to screw into the threads of the hub or bell. This plug is provided with a centrally-located nipple 3, which has a wrench-hold 4 thereon to receive a wrench whereby to screw the plug in place. The outer end is screw-threaded, as at 5, and adapted to receive a cap 6, by means of which the nipple is closed from the outside.

A washer 7 is adapted to be used when necessary to give a finish to the job where the work is exposed to view, and this washer will be made rough, polished, nickel-plated, or otherwise embellished to give an attractive and ornamental appearance. When the washer is used, the cap is screwed on over it.

In order to get into the pipe or fitting to clean it out, the cap is unscrewed, when a rod or wire or small length of pipe can be run through the nipple into pipe or fitting to clean out the same. In case it is desired to remove the plug that can be easily done by unscrewing it by simply applying a monkey-wrench to the angular portion.

When testing a soil-pipe, it is only necessary to remove the cap from the nipple, when the water-service pipe can be connected to it without the necessity of disturbing the joint at all.

This improved plug can be inserted in the opening of every fitting and also inserted in a length of soil-pipe or wrought-iron pipe, any soil-pipe fitting, or wrought-iron fitting in the same manner as in a cast-iron soil-pipe, as it works just as effectually with one as another.

Slight alterations are possible in the form and arrangement of the various features described without departure from the spirit of the invention, and therefore I do not wish to be restricted to the precise details set forth, which are described merely as one feasible embodiment of my invention; but, Having fully described my invention, what I claim as new, and desire to secure by Letters Patent, is—

1. The combination with a pipe or fitting having threads therein, of a plug having threads which screw into the threads in the pipe or fitting, said plug having a nipple which extends to the outer end of the pipe or fitting, a plate having an orifice to receive the end of the nipple while the plate rests against the end of the pipe or fitting, and means for retaining the plate in place on the nipple and against the end of the pipe or fitting.

2. The combination with a pipe or fitting having threads therein, of a plug comprising a head and nipple, the head screw-threaded and adapted to screw into the threads in the pipe or fitting, the nipple extending to the outer end of the pipe and having a wrench-hold thereon approximately in line with the end of the pipe or fitting as a means by which the plug is screwed into or out of the pipe, a plate having an orifice adapted to receive the end of the nipple, the plate adapted to rest on the nut and the end of the pipe and means adapted to be placed on the outer end of the nipple for retaining the plate in place.

3. The combination with a pipe or fitting having threads therein, of a plug threaded to screw thereinto, said plug having a nipple threaded at its outer end, a plate having a hole to receive the nipple and of sufficient diameter to close the pipe or fitting, and a cap removably secured on the outer end of the nipple adapted to hold the plate in place and close the nipple.

4. The combination with a pipe or fitting having a screw-thread therein, of a plug comprising a head and nipple, the head having screw-threads adapted to screw into the threads in the pipe and the nipple protruding beyond the end of the pipe, a plate or cap for closing the outer end of the pipe or fitting, said plate having an orifice through which the nipple projects and means for closing the protruding end of the nipple.

5. The combination with a pipe or fitting having a screw-thread therein, of a plug comprising a threaded head and a nipple, the outer end of which reaches beyond the end of the pipe or fitting and is screw-threaded, means on the outer end of the nipple for closing both the pipe or fitting and the nipple.

In testimony whereof I have signed this specification in the presence of two subscribing witnesses.

C. M. CAMPBELL.

Witnesses:
COLIN CAMPBELL,
J. MALTON SMITH.